(12) United States Patent
Wang

(10) Patent No.: US 11,741,241 B2
(45) Date of Patent: *Aug. 29, 2023

(54) PRIVATE DATA PROCESSING

(71) Applicant: Visa International Service Association, San Francisco, CA (US)

(72) Inventor: Quan Wang, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 36 days.

This patent is subject to a terminal disclaimer.

(21) Appl. No.: 17/461,962

(22) Filed: Aug. 30, 2021

(65) Prior Publication Data

US 2021/0397720 A1    Dec. 23, 2021

Related U.S. Application Data

(63) Continuation of application No. 16/630,812, filed as application No. PCT/US2017/044864 on Aug. 1, 2017, now Pat. No. 11,138,322.

(51) Int. Cl.
G06F 21/60 (2013.01)
G06F 16/27 (2019.01)
(Continued)

(52) U.S. Cl.
CPC ............ *G06F 21/602* (2013.01); *G06F 16/27* (2019.01); *G06F 21/6218* (2013.01);
(Continued)

(58) Field of Classification Search
CPC .... G06F 21/602; G06F 16/27; G06F 21/6218; G06F 21/64; H04L 9/0637; H04L 9/0841; H04L 9/30; H04L 63/0435; H04L 9/50
See application file for complete search history.

(56) References Cited

U.S. PATENT DOCUMENTS 10,109,219 B2 * 10/2018 Zhou .................... G06F 3/017
10,733,618 B2 * 8/2020 Howe ............... G06Q 20/3224
(Continued)

FOREIGN PATENT DOCUMENTS

| CN | 101627395 A | 1/2010 |
| CN | 105474601 A | 4/2016 |
| WO | 2017095036 | 6/2017 |

OTHER PUBLICATIONS

EP17920229.6, "Office Action", dated Feb. 15, 2022, 9 pages.
(Continued)

*Primary Examiner* — Yonas A Bayou
(74) *Attorney, Agent, or Firm* — Kilpatrick Townsend & Stockton LLP

(57) ABSTRACT

A method includes storing, in one or more databases amongst a plurality of databases by one or more nodes in a distributed database system, data for one or more of network enabled devices. The data for each network enabled device includes encrypted private data, and metadata associated with the private data. The metadata may include permissions data, time period validation data, and encryption parameters. In addition, the method may include locating the encrypted first private data and determining using first permissions data associated with the encrypted first private data and using the second network-enabled device identifier if the second network-enabled device is authorized to access the first private data. The method includes providing the first private data to the second network-enabled device. The second network-enabled device obtains and decrypts the encrypted first private data to obtain the first private data.

20 Claims, 6 Drawing Sheets

(51) Int. Cl.
*G06F 21/62* (2013.01)
*G06F 21/64* (2013.01)
*H04L 9/06* (2006.01)
*H04L 9/08* (2006.01)
*H04L 9/30* (2006.01)
*H04L 29/06* (2006.01)
*H04L 9/40* (2022.01)
*H04L 9/00* (2022.01)

(52) U.S. Cl.
CPC ............ *G06F 21/64* (2013.01); *H04L 9/0637* (2013.01); *H04L 9/0841* (2013.01); *H04L 9/30* (2013.01); *H04L 63/0435* (2013.01); *H04L 9/50* (2022.05)

(56) References Cited

U.S. PATENT DOCUMENTS

| | | | |
|---|---|---|---|
| 11,138,322 | B2 | 10/2021 | Wang |
| 2012/0089839 | A1 | 4/2012 | Qiu et al. |
| 2013/0185815 | A1 | 7/2013 | Leotsarakos |
| 2013/0290234 | A1 | 10/2013 | Harris et al. |
| 2015/0039888 | A1 | 2/2015 | Barrus et al. |
| 2016/0085861 | A1 | 3/2016 | Vecera et al. |
| 2016/0188902 | A1 | 6/2016 | Jin |
| 2016/0212194 | A1 | 7/2016 | Palin et al. |
| 2017/0147528 | A1* | 5/2017 | Sun ................ G06F 13/4286 |
| 2017/0169250 | A1* | 6/2017 | White ................ H04L 9/0822 |
| 2017/0289134 | A1* | 10/2017 | Bradley ............. H04L 63/105 |
| 2018/0191506 | A1* | 7/2018 | Vilvovsky .............. H04L 9/14 |
| 2018/0302215 | A1* | 10/2018 | Salgueiro ........... H04L 65/4025 |
| 2019/0087554 | A1* | 3/2019 | Fish ................ H04M 1/724631 |
| 2019/0109713 | A1* | 4/2019 | Clark .................. G06F 16/182 |
| 2019/0140832 | A1* | 5/2019 | Leavy ................. H04L 9/3247 |
| 2019/0156326 | A1* | 5/2019 | Todasco ................. H04W 4/80 |
| 2019/0332793 | A1* | 10/2019 | Guinan ................ H04L 67/141 |
| 2019/0349733 | A1* | 11/2019 | Nolan ................ H04L 41/0806 |

OTHER PUBLICATIONS

U.S. Appl. No. 16/630,812, "Non-Final Office Action", dated Nov. 9, 2020, 12 pages.
U.S. Appl. No. 16/630,812, "Notice of Allowability", dated Jun. 18, 2021, 2 pages.
U.S. Appl. No. 16/630,812, "Notice of Allowance", dated Feb. 24, 2021, 11 pages.
U.S. Appl. No. 16/630,812, "Notice of Allowance", dated Jun. 9, 2021, 9 pages.
EP17920229.6, "Extended European Search Report", dated Jul. 17, 2020, 9 pages.
Kravitz et al., "Securing User Identity and Transactions Symbiotically: IoT Meets Blockchain", Global Internet of Things Summit, IEEE, Jun. 6, 2017, pp. 1-6.
PCT/US2017/044864, "International Preliminary Report on Patentability", dated Feb. 13, 2020, 7 pages.
PCT/US2017/044864, "International Search Report and Written Opinion", dated Apr. 25, 2018, 12 pages.
CN201780093585.8, "Office Action", dated Mar. 16, 2023, 16 pages.

\* cited by examiner

PRIVATE DATA PROCESSING

CROSS-REFERENCES TO RELATED APPLICATIONS

This application is a Continuation Application of U.S. patent application Ser. No. 16/630,812 filed on Jan. 13, 2020, which is a National Stage of International Application No. PCT/US2017/044864, filed on Aug. 1, 2017 are herein incorporated by reference in their entirety for all purposes.

BACKGROUND

In today's technological environment, it is often required for users to submit private data in order to use various services. Typically, applications that involve the transfer of personal information rely on centralized servers. In such instances, users are expected to trust that centralized service providers are not using their personal data in unwanted ways and without their consent. In some cases, the centralized service providers may even require users to agree to give up personal information in order to use their services. In addition, security between IOT devices is also a major concern, as such devices have proven susceptible to hacks, which may be especially concerning with regards to various machines, such as smart vehicles and appliances. What is needed in the art, is a secure method for exchanging and processing private data between devices.

Embodiments of the invention address these and other issues, individually and collectively.

BRIEF SUMMARY

One embodiment of the invention is directed to a method comprising storing, in one or more databases amongst a plurality of databases by one or more nodes in a distributed database system, data for one or more network-enabled devices, wherein the data for each network-enabled device comprises encrypted private data, and metadata associated with the private data. The metadata may comprise permissions data, time period validation data, and encryption parameters. The method may further comprise receiving an access request from a second network-enabled device to access first private data associated with a first network-enabled device. The access request may comprise a first network-enabled device identifier and a second network-enabled device identifier. In addition, the method may comprise locating, by the one or more nodes, and using the first network-enabled device identifier, a location of the encrypted first private data and determining using first permissions data associated with the encrypted first private data and using the second network-enabled device identifier if the second network-enabled device is authorized to access the first private data, and providing the first private data to the second network-enabled device, wherein the second network enabled device obtains and decrypts the encrypted first private data to obtain the first private data.

In an embodiment, the first network-enabled device identifier is a first network enabled device public key, and the second network-enabled device identifier is a second network-enabled device identifier public key. In another embodiment, the first network-enabled device shares a symmetric key with the second network-enabled device using a Diffie-Hellman key exchange protocol. In yet another embodiment, the encrypted data comprises one or more of a location of the first network enabled device, instructions for operating the first network enabled device, a unique identifier for the first network enabled device, ownership information of the first network enabled device, and/or operating conditions of the network enabled device, in encrypted form.

Other embodiments are directed towards computer systems and devices comprising a processor, and a computer readable medium coupled to the processor, for implementing the above method.

Further details regarding embodiments of the invention can be found in the detailed description and figures described herein.

TERMS

Figure 1:
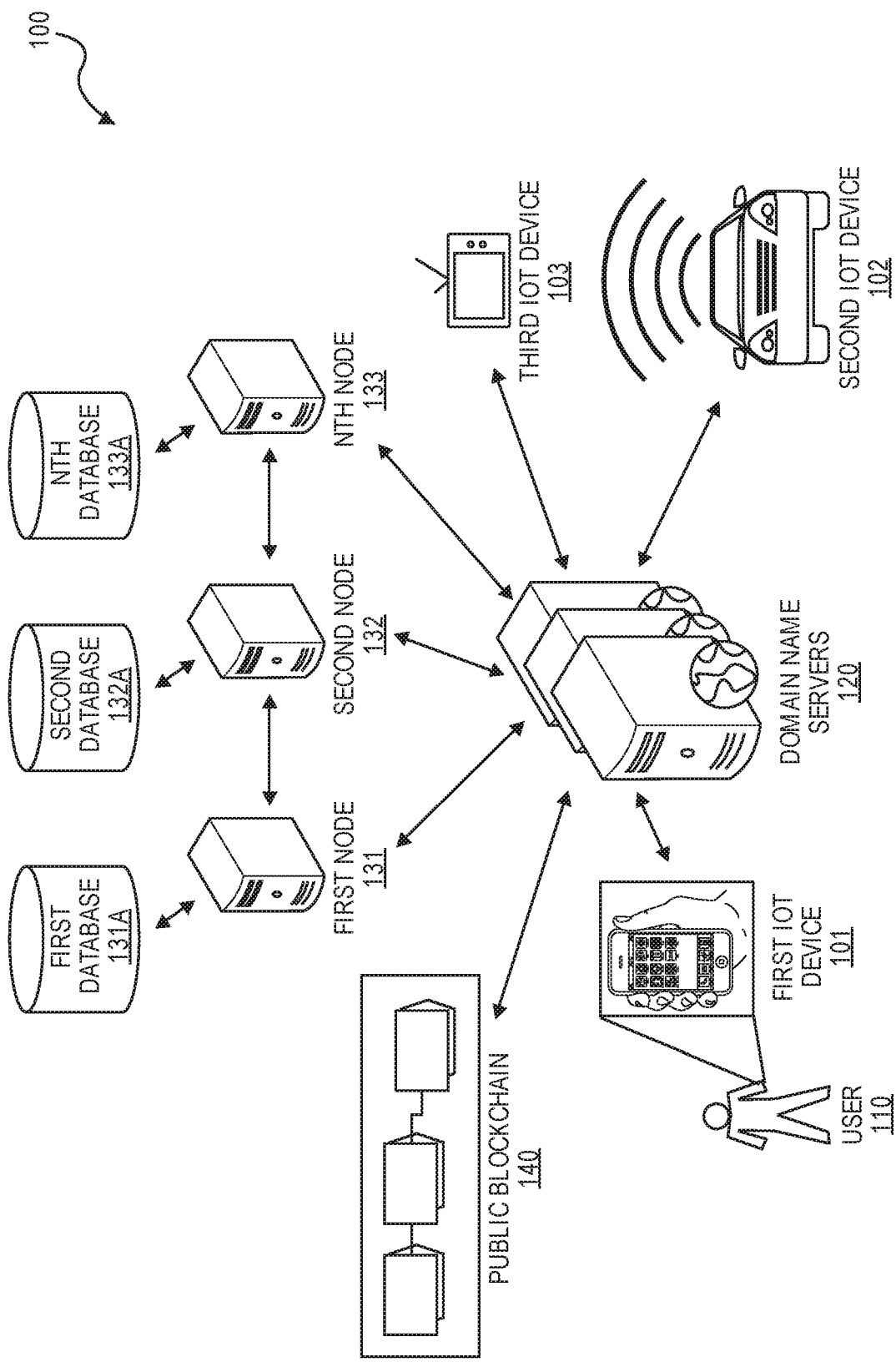
FIG. 1 shows a system for exchanging private data between devices.

The term "server" may refer to a device that services the requests of one or more client devices. Functionalities provided by a server can also be referred to as "services." A server can provide services to one or more devices over a network. For example, a server can be used to store and/or locate data according to a pre-established network protocol. A server that provides services over a network can be referred to as a "network host."

The term "Domain Name System" or "DNS" may refer to a system for translating names and/or addresses of devices. For example, a DNS may be used to translate recognizable names of devices (e.g. my car, my phone, etc.) to network addresses that distinguish each device. A server that translates names and address of a DNS can be referred to as a "DNS server."

A "network node" or "node" can refer to a connection point in a network. Network nodes can include devices and servers capable of receiving and/or sending data. For example, a node can be a personal computer, mobile phone, or any other device with a sufficient network interface.

The term "registrar" may refer to a keeper of records. The records may be digital records, and the registrar can be, for example, a dedicated server for managing the digital records. A list of records managed by a registrar can be referred to as a "registry." A digital registry can be stored on a device in memory.

The term "cache" may refer to a collection of items stored in for future reference. For example, a "cache" can be a memory storage, in which the network addresses of recent or frequently contacted devices can be stored. Caching data may be performed, such that the data can be accessed more efficiently.

A "user device" can include any device that may belong to and/or is operable by a user. For example, user devices can include mobile phones, PDAs, table computers, laptop computers, music players, hand-held readers, etc. Further examples can include wearable devices, such as smart watches, fitness bands, rings, eyewear, etc. A user device can also be a machine with network capabilities, such as an IoT device.

The term "Internet of Things" or "IoT" may refer to a concept in which everyday objects can receive and exchange data. For example, typical objects such as vehicles, buildings, homes, and appliances can be fitted with electronics and network capability, such that data can be collected and/or shared while said objects are in use. An object designed and/or produced based on an IOT concept can be referred to as an "IOT device."

The term "blockchain" may refer to a distributed database for maintaining a list of records. A blockchain can be inherently resistant to the modification data, such that records are intended to be immutable. Records in a blockchain may be stored in blocks, in which each block contains a timestamp and a link to a previous block.

A "Key-value" pair may refer to a set of two linked data items. In a key-value pair, unique identifiers (keys) for each item of data can be linked in a table to its value. The value can be a value itself, or can be a pointer to the location of the data. For example, a key may be "account number," and the value may be "1234 5678 1242 1242."

An "application" may refer to computer code or other data stored on a computer readable medium executable by a processor to complete a task. For example, an application can be a mobile application stored on a memory of a mobile device, such as a camera application, messaging application, ride-sharing application, etc.

The term "encryption" may refer to the process of converting information into a meaningless representation. This can be done to prevent the information from being read by an entity that is not authorized. An "encryption key" (sometimes simply referred to as a "key") can be a variable or value of an encryption algorithm used to encrypt data. For example, an encryption key can be a string of bits. An encryption value that can encrypt and decrypt data in the same manner can be referred to as a "symmetric key."

The term "asymmetric encryption" may refer to a form of encryption that uses public keys and private keys. Asymmetric encryption may also be referred to as "public key cryptography." A "public key" can be an encryption key that can be shared or is made public. A "private key" can be an encryption key that is available only to its owner.

The term "metadata" may refer to data that can serve as information about other data. For example, metadata can include a title or keywords associated with data, or can include information about how data is managed. When data is created or exchanged, metadata relating to the data can be present.

DETAILED DESCRIPTION

Embodiments are directed to secure methods and computer systems for sharing private data between devices.

FIG. 1 shows a system for exchanging private data between devices. System 100 may comprise domain name servers 120 connected to one or more nodes of a distributed database system, such as first node 131, second node 132, and nth node 133. The one or more nodes may be capable of communicating over a network, which can include, for example, the Internet and/or a telecommunications network. The nodes of the network can be servers, computers, user devices, or any network enable device capable of processing data. The nodes may further be coupled to one or more databases, such as first database 131A, second database 132A, and nth database 133A. In embodiments, the one or more databases may store private data in encrypted form. In addition, domain name servers 120 may further be connected to public blockchain 140, which may be a public database of immutable records that is distributed to several nodes.

According to embodiments, a user 110 may operate or own one or more IOT devices, such as first IOT device 101, second IOT device 102, and third IOT device 103. For example, first IOT device 101 can be a mobile phone, second IOT device can be a self-driving car, and third IOT device can be a smart television. The one or more IOT devices can further be nodes in the network described above. In embodiments, the one or more IOT devices may be any network-enabled device comprising a processor and memory. Each IOT device may be identifiable to user 110 by a human recognizable name (e.g. my phone, my car, my T.V., etc.), which may be established during registration. In one embodiment, registration may comprise establishing a group of devices, and adding each device to a registry maintained by a registrar. The registrar may be, for example, a dedicated domain name server of domain name servers 120 that can record the human recognizable name of each device and its corresponding network address. During communications between the IOT devices, the human recognizable name for each IOT device can further be translated to a corresponding network address by one or more domain name servers of domain name servers 120. In one embodiment, the network addresses can be public addresses/public keys for each IOT device. In another embodiment, a registry of public keys of devices registered for a group of devices can be cached at one or more of the devices in the group of devices.

When user 110 wishes to share private data between a first IOT device 101 and a second IOT device 102 within a group of registered devices, user 110 may first generate the private data at the first IOT device 101. In one embodiment, an application stored on the first IOT device may comprise a user interface that allows user 110 to generate the private data. For example, a transportation application stored on first IOT 101 device may comprise a graphical user interface showing a map of the user's current location, a text entry field for entering a selected destination, and an icon for a vehicle to transport user 110 from his or her current location to the selected destination. In one embodiment, the vehicle may be second IOT device 102, which can be a self-driving car that is identified by user 110 according to its human recognizable name (e.g. "my car"). Upon the proper selections, first IOT device 110 may generate the private data, which may include the user 110's current location, his or her selected destination, and an identifier for second IOT device 102 (e.g. a human recognizable name or network address).

In embodiments, the private data generated at first IOT device 101 may be encrypted using a symmetric key. In one embodiment, the symmetric key may be derived according to a Diffie-Hellman key exchange algorithm or using any other suitable protocol, such as a protocol that generates encryption keys as shared secrets. In an application of the Diffie-Hellman key exchange algorithm, the symmetric key that is shared between two devices, can be derived by the first IOT device 101 using a private key of first IOT device 101 and a public key of second IOT device 102, and can be derived by the second IOT device 102 using a private key of the second IOT device 102 and a public key of the first IOT device 101. In one embodiment, the public key of each device can be its network address or an identifier thereof. More information regarding the Diffie-Hellman key exchange can be found in U.S. Pat. No. 4,200,770, which is herein incorporated by reference in its entirety for all purposes.

Once the private data has been encrypted using the symmetric key, the encrypted data may then be included into a data message for processing. The data message may include, in clear text, metadata relating to the encrypted data. In one embodiment, the metadata may comprise permissions data, time period validation data, and encryption parameters. In embodiments, permissions data may be set using a first IOT device 101, so as to specify which devices are authorized access to the private data. For example, the permissions data may comprise the public key of second IOT device 102, which can be compared to a public key received from a requesting device at a later point in time in order to determine if the requesting device is authorized.

As previously mentioned, the metadata may also comprise encryption parameters, which can be expressed as key-value pairs. For example, the encryption algorithm can be an AES-128-CTR encryption algorithm, and the encryption parameters may include the various input variables used during the encryption process, such as a variant (128 bit, 256 bit, etc.), an initialization vector, a salt (random data), a type of authentication code (e.g. HMACSHA256), and any other necessary information for encrypting/decrypting data according to the algorithm used. The name of the encryption parameters (e.g. variant, initialization vector, authentication code type, etc.) may serve as a key, and the values of these parameters (e.g. 256 bit, 12024as;lkdfj0129aierj082, 9349023jfIkjalkdjf, HMACSHA256, etc.) or pointers as to the location of those values, may serve as the values in a key-value pair.

In embodiments, the time validation data included in the message may include a timestamp. For example, a timestamp for the universal time at which the message was generated may be included (e.g. Mon, 17 Jul 2017 23:01:00+0000). In embodiments, the time validation data can be used to set an expiration date and/or time for the private data. For example, a policy can be established, such that the generated private data can only exist for 24 hours. The timestamp can then later be used to determine if the 24 hours has passed and if the private data should be erased.

Once the data message comprising the metadata and encrypted private data has been generated, the data message may be sent to the one or more nodes of the distributed database system. In one embodiment, copies of the data message and the metadata and encrypted private data contained therein may be stored by multiple nodes and in multiple databases. For example, the data message and/or portions thereof may be stored in first database 131A and also in nth database 133A. As such, the metadata and encrypted private data can be stored in a manner that is secure against a single point of vulnerability attack.

In embodiments, a signal may be sent to second IOT device 102 indicating that the private data has been submitted to the distributed database system. In one embodiment, the signal may be a telecommunications signal sent according to an SS7 protocol. For example, a digital control signal may be sent to second IOT device 102 (e.g. to the self-driving car), which may indicate to the second IOT device 102 that user's location has been submitted. In one embodiment, the signal may be sent from a node of the distributed database system. In another embodiment, the signal may be sent from first IOT device 101 and/or another device of the group of network-enabled devices.

Once second IOT device 102 has received the signal, the second IOT device 102 may generate an access request for the private data submitted by first IOT device 101. The access request may comprise an identifier for first IOT device 101 and an identifier for second IOT device 102. In one embodiment, the identifiers may be the public keys and/or network addresses of the devices. Once the access request has been received by the one or more nodes of the distributed database system, the requested data may be located and retrieved.

The one or more nodes may then use the metadata of the encrypted private data to determine if second IOT device 102 is authorized access. In an embodiment, the one or more nodes may compare the permissions data to the identifier of second IOT device 102. If the identifier of second IOT device 102 matches information specified in the permission data, the one or more nodes may provide the encrypted private data and metadata thereof to second IOT device 102. For example, the received identifier may be a public key of IOT device 102, which can be compared to a public key specified in permissions data of metadata for the private data to determine a match.

The data may be received by second IOT device 102 and decrypted using the symmetric encryption key, which in an embodiment can be shared using a Diffie-Hellman key exchange, as described above. Upon decryption of the private data, second IOT 102 may then use the private data for completing its task/service (e.g. using user 110's current location to pick up user 110 and transport him or her to his or her selected destination). In other embodiments, symmetric keys on different devices may be generated using shared secrets on those devices, and algorithms known to those devices. Variable data elements such as counters or timestamps may be used to change those symmetric keys. In such embodiments, encryption keys for encrypting or decrypting data may be independently generated by the different devices that need to share private data.

Figure 2A:
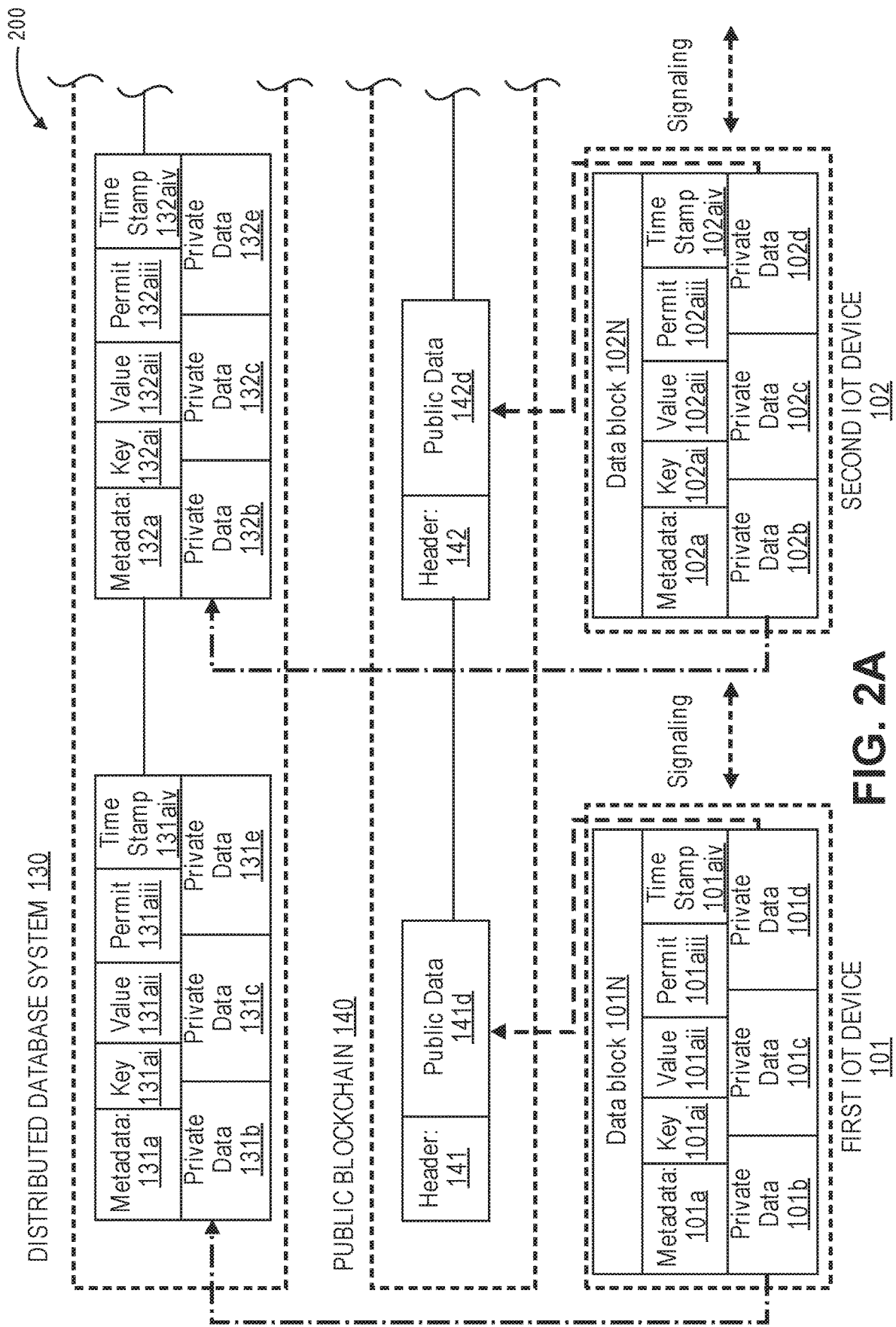
FIG. 2A and FIG. 2B show a data flow diagram for an embodiment.
Figure 2B:
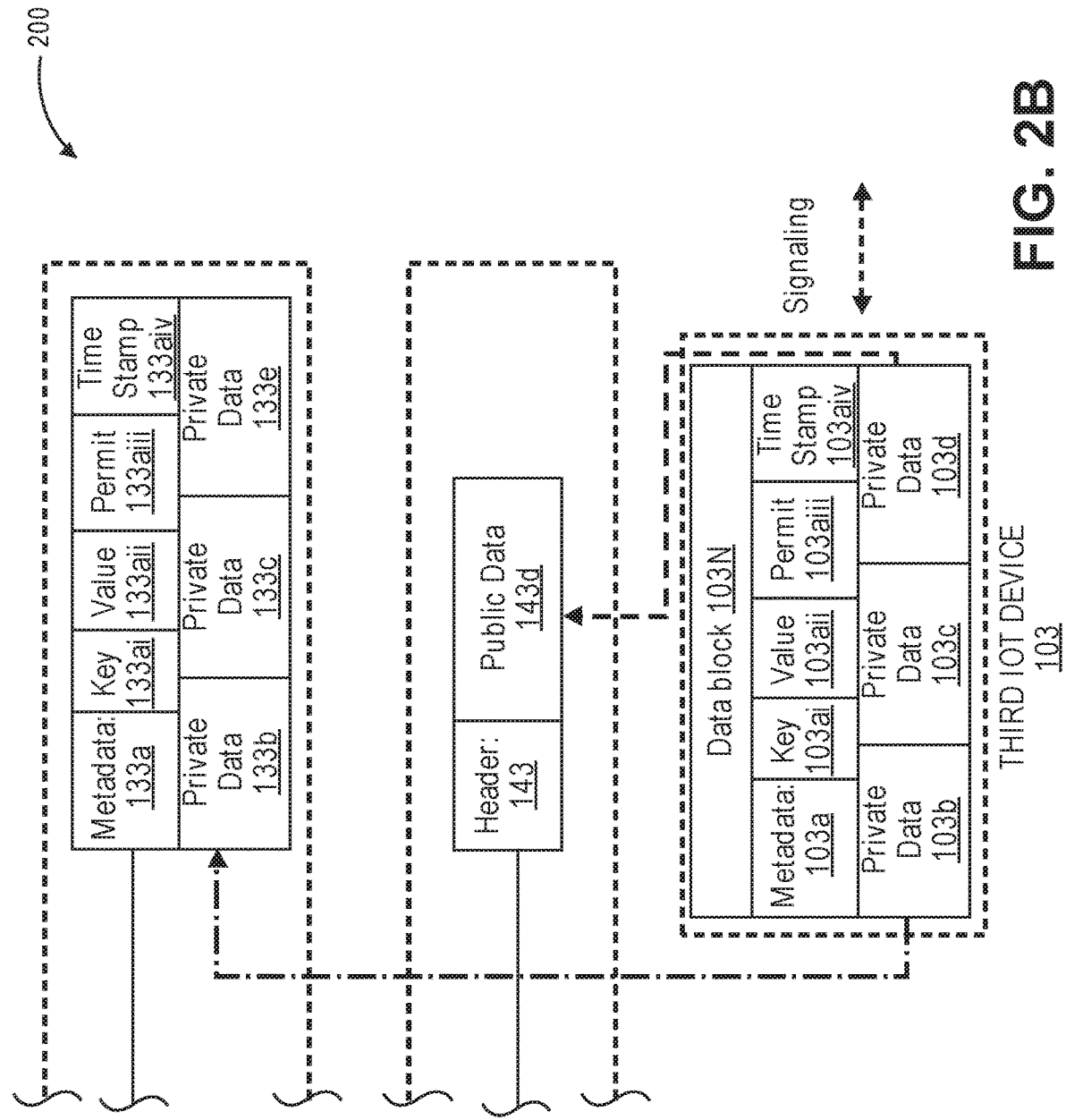

FIG. 2A and FIG. 2B show a data flow diagram for an embodiment. Data flow 200 may comprise data exchanged between first IOT device 101, second IOT device 102, and third IOT device 103. The data may be exchanged in conjunction with distributed database system 130 and public blockchain 140. During an action performed by an IOT device, a data block may be generated, such as data block 101N, data block 102N, and data block 103N. An example of an action performed by an IOT device can include a task performed by an appliance, vehicle, or other machine, or may include a request made to another device, such as a request to pick-up a user at a given location. Each data block may comprise encrypted private data, such as private data 101b, 101c, 102b, 102c, 103b, 103c, etc. The private data can be any sensitive information that is to be shared between a plurality of devices in a group, and that is to be kept secret by the devices that are authorized access. For example, private data 101b, 102b, and 103b may be the current locations of first IOT device 101, second IOT device 102, and third IOT device 103 respectively. In other examples, private data 101c may be the name of a user that owns first IOT device 101, private data 102c may be operating instructions and/or operating conditions of second IOT device 102, and private data 103c may be a unique identifier of third IOT device 103 (e.g. "James' car", "Living Room T.V.", "Smith Family Refrigerator," etc.).

Furthermore, when an action is performed, public data (e.g. public data 101d, 102d, 103d, etc.) may also be generated and published to public blockchain 140. In one embodiment, an action may be associated with a transaction that is to be recorded, which can be published to public blockchain 140 for accounting and value exchange purposes. For example, third IOT device 103 may be a washing machine or other appliance that may require an exchange of funds to use, and the exchange of funds may be published to public blockchain 140 as a public record that can later be verified. According to embodiments, public data can be published to public blockchain 140 according to a consensus algorithm, as public data 141*d*, 142*d*, 143*d*, etc. The immutable blocks may further comprise headers, such as header 141, 142, and 143, which may comprise timestamps and links to previous blocks. More information regarding blockchains can be found at: Nakamoto S (2008) Bitcoin: a peer-to-peer electronic cash system, http://bitcoin.org/bitcoin.pdf, Retrieved 18 Jul. 2017.

As previously explained above, private data generated by an IOT device may be associated with metadata, such as metadata 101*a*, 102*a*, 103*a*, etc. The metadata may be clear text, describing encrypted private data of a data block and/or received in a data message. The metadata may include encryption parameters that may be used by an authorized device in possession of the encryption key to decrypt the private data. In one embodiment, the encryption parameters may be identified by keys that label the encryption parameters (e.g. "ciper"=, "initialization vector"=, "authentication code type"=, "salt"=), associated with values for the encryption parameters (e.g. "=aes-128-ctr", "=23asdlfkj007", "=hmacsha256", "77238078235io235kljqelfkjaskldfj").

In embodiments, the encryption parameters can include any information describing the encryption algorithm used and/or inputs thereof, such that a device in possession of the encryption key may have all the necessary information for decryption. In an embodiment, the key-value pairs representing the encryption parameters, can be expressed as an index table or "look-up" table. For example, the keys: key 101*ai*, 102*ai*, 103*ai*, can be expressed in a first column of the index table, while the value for each key: value 101*aii*, 102*aii*, 103*aii*, and 103*aii*, can be expressed in a second column such that each key is adjacent to its corresponding value in the table. In one embodiment, the key-value pairs may be modified at a later point in time, so as to update encryption parameters for greater security or to communicate any additional data that may be necessary or that may provide greater functionality.

Metadata for each data block may further comprise one or more permits such as permit 101*aiii*, 102*aiii*, and 103*aiii*. The one or more permits may include permissions data, specifying which devices are authorized access to each piece of private data. For example, permit 101*aiii* may specify that second IOT device is authorized access to private data 101*b*, which may be a user's location, and may also specify that third IOT device is authorized access to private data 101*c*, which may be the user's name. As such, the permissions data may allow IOT devices within a group of devices to share private data as necessary for performing a task/action (e.g. transporting a user, placing an order/conducting a transaction, adjusting a climate setting, etc.), and without sharing any additional private data that is not needed. In addition, the metadata for each data block may comprise a timestamp giving the time and date at which a specific piece of private data was generated. The timestamp can later be referred to when setting and implementing policies as to the duration a piece of private is allowed to exist before being erased and/or dumped. This may limit the possible exposure of private data, such that an attacker may not have an opportunity to access the private data at a later time.

Once private data has been generated and encrypted, it can be shared between devices via distributed database system 130. A data message comprising an identifier for an originating device, the encrypted private data, and the metadata describing the encrypted private data may be sent from its originating device (e.g. first IOT device 101) to distributed database system 130, where it can later be retrieved for a requesting device (e.g. second IOT device 102). The distributed database system 130 may comprise a plurality of nodes in a network that may each be coupled to one or more databases. In one embodiment, multiple copies of the encrypted private data and metadata thereof may be stored in the distributed database system 130. For example, the encrypted private data may be stored by a plurality of nodes, such that it is stored in 60% of the databases in the system. This may be done such that attempts to alter the private data may be detected, as the contents of the private data can be confirmed between nodes.

According to embodiments, private data stored in distributed database system 130 can be accessed by an authorized device. The authorized device may be notified of the presence of the private data by a signal sent from the originating device that wishes to share the private data. For example, a digital SS7 control signal may be sent from first IOT device 101 to second IOT device 102. Upon receiving of the signal, second IOT device 102 may generate an access request to distributed database system for the private data originating from first IOT device 101. The access request may comprise the identifier for the originating device (e.g. a public key of the originating device) and an identifier for the requesting device (e.g. a public key of the requesting device). The access may then be sent to the distributed database system, where it may be received by one or more nodes. In one embodiment, the access request may be sent to one or more nodes using an address format comprising an identifier (e.g. public key) of the one or more nodes and an address port. For example, the address of the one or more nodes may take the form: b837c6fd01d0802d457d143e3bd48bd3e6509f8209ed90dabbc30e3d3@8.8.8.8:30303.

In embodiments, the one or more nodes may then use the identifiers in the access request to locate the encrypted private data. For example, the one or more nodes may query a local database or may communicate with each other to find a database storing private data associated with the identifier of first IOT device 101. The one or more nodes may further determine private data of the first IOT device 101 that is accessible to the requesting device (second IOT device 102), as specified in permissions data of the associated metadata for the private data.

If the requesting device is identified as authorized by the permission data, the encrypted private data and clear text metadata may be sent to the requesting device. Then, the key-value pairs of the metadata may be read by the requesting device to decrypt the private data. For example, the key-value pairs may include encryption parameters that serve as input variables to an encryption algorithm along with a symmetric key derived using a Diffie-Hellman key share protocol. From the encryption parameters and symmetric key, the private data may be decrypted and used by the requesting device to perform its given task. For example, the second IOT device 102 may use first IOT device 101's private location to pick up a user of first IOT device 101 and transport the user to his or her selected destination.

Figure 3:
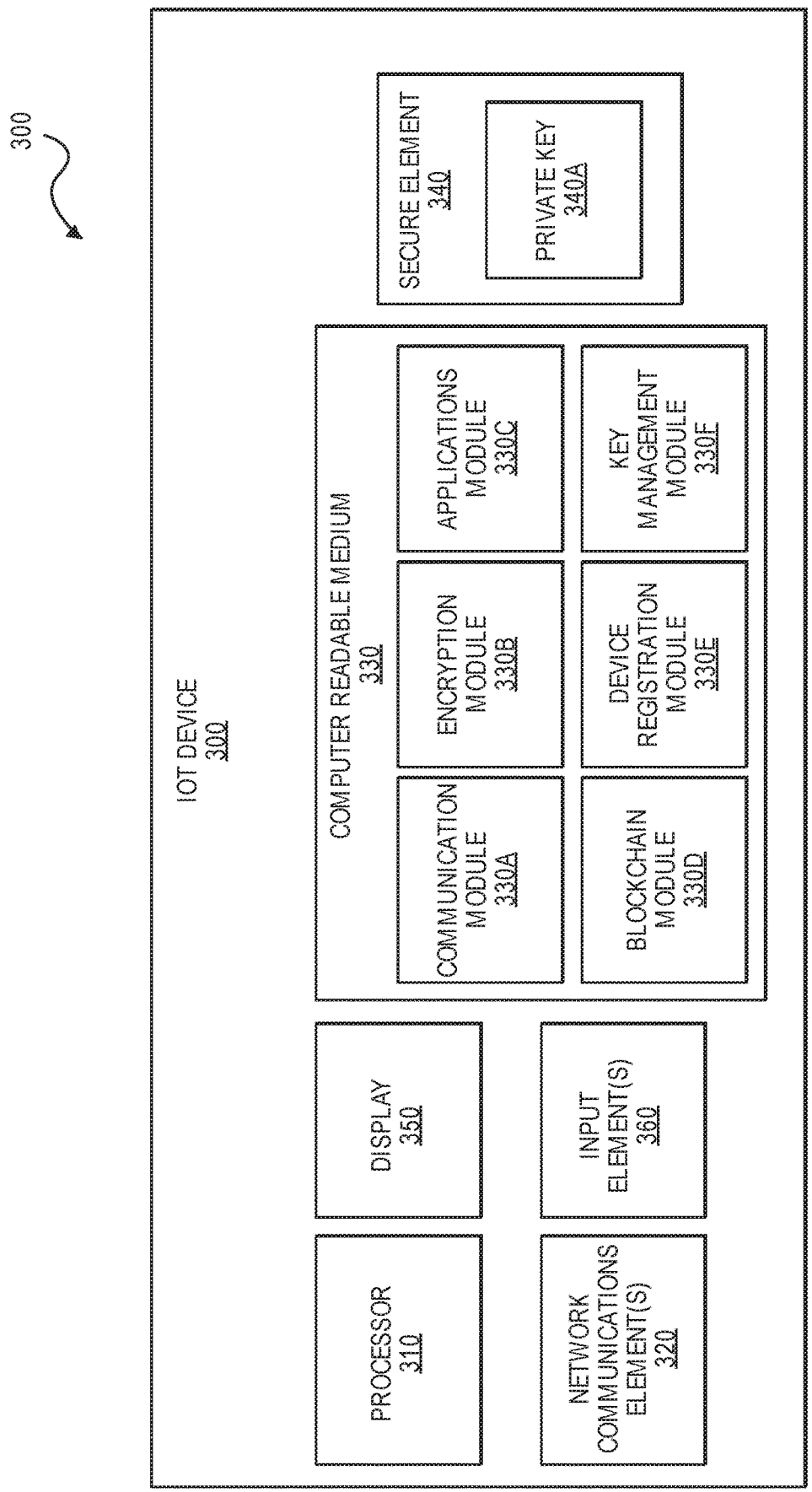
FIG. 3 shows a block diagram of an IOT device according to an embodiment.

FIG. 3 shows a block diagram of an IOT device according to an embodiment. IOT device 300 may comprise a processor 310 for executing instructions. IOT device 300 may further comprise one or more network communications element(s) 320 for sending and receiving messages over a network, and input element(s) 360 for receiving inputs from a user. IOT device 300 may additionally comprise display 350 for displaying information to the user.

According to embodiments, IOT device 300 may comprise computer readable medium 330 for storing instructions executable by processor 310. In an embodiment computer readable medium 330 may be a memory storing modules of code, such as communication module 330A, encryption module 330B, applications module 330C, blockchain module 330D, device registration module 330E, key management module 330F.

Communication module 330A may comprise code for receiving, sending, and reformatting messages over a network. The messages may be sent via network communication element(s) 320. Communication module 330A may comprise code for generating, formatting, sending, and receiving a data message comprising encrypted private data and metadata associated with the private data. In one embodiment, communication module 330A may comprise code for generating and sending an access request for requesting private data. The access request may comprise one or more identifiers for network-enabled devices. The identifiers may be public keys of a first and second IOT device in a group of IOT devices, such as public keys of first IOT device 101 and second IOT device 102 of FIG. 1.

Encryption module 330B may comprise code for encrypting data. This may include code for an encryption algorithm. In one embodiment, encryption module 330B may comprise code for generating encryption parameters and using the encryption parameters and a symmetric encryption key as inputs to an encryption algorithm to encrypt data. In one embodiment, encryption module 330B may comprise code for storing the encryption parameters in a look-up table of key-value pairs that can be expressed as metadata. Encryption module 330B may further comprise code for reading encryption parameters from metadata, and using the encryption parameters and a symmetric encryption key to decrypt private data.

Applications module 330C may comprise code for one or more applications. The one or more applications may comprise code for generating permissions data and for generating time period validation data. Examples of applications can include: device management applications, transportation applications, remote operation applications, digital transaction applications, media/entertainment applications, etc. In one embodiment, applications module 330O may further comprise code for generating private data. The private data may include a location of IOT device 300, a unique identifier for IOT device 300, ownership information for IOT device 300, and/or operating conditions of IOT device 300.

Blockchain module 330D may comprise code for generating blockchain data and/or code for interacting with a blockchain (e.g. a public or private blockchain). In embodiments, blockchain module 330D may comprise code for hashing data according to a hashing algorithm, such as SHA-256. The data may be public data, such as data for a public transaction. Blockchain module 330D may further comprise implementing a digital signature algorithm, and signing a hash using a private key of IOT device 300. Blockchain module 330D may further comprise code for generating a block comprising a signed hash record, and may additionally comprise code for publishing a block to a blockchain or submitting the block to one or nodes that publish the block according to a consensus algorithm.

Device registration module 330E may comprise code for registering a device into a group of devices. The registration instructions may include establishing an account, generating a registry for a group of devices, establishing a human-recognizable name for a device, associating the human-recognizable name with a network address of the device, and storing the association in cache. For example, the device registration module may comprise code for establishing a user name and password for one or more users of the IOT device 300, establishing a group comprising one or more devices that can be included in a registry, and code for establishing a nickname that users of the devices can recognize, such as "Mary's car," "Lopez Family Washing Machine," "Destiny's phone," etc. The accounts, group, and nicknames can then be associated with the network addresses of the corresponding devices and stored in memory, such that when an action is initiated, the human-recognizable names can be translated into network addresses that a network node can process.

Key management module 330F may comprise code for deriving, exchanging, storing, and retrieving one or more encryption keys. The encryption keys may include a public key and private key of a user, a public key and private key of IOT device 300, and one or more symmetric keys. In one embodiment, the one or more symmetric keys may be keys shared via a Diffie-Hellman key exchange, as described above. Each symmetric key may be derived from the private key of IOT device 300 and a public key of a device that the symmetric key is to be shared with.

IOT device 300 may additionally comprise secure element 340 storing private key 340A. Secure element 340 maybe a tamper-resistant platform for securely storing data. For example, the secure element can be a secure microcontroller. In embodiments, the secure element can be physical hardware or can be virtual (e.g. such as in the case of host card emulation).

Figure 4:
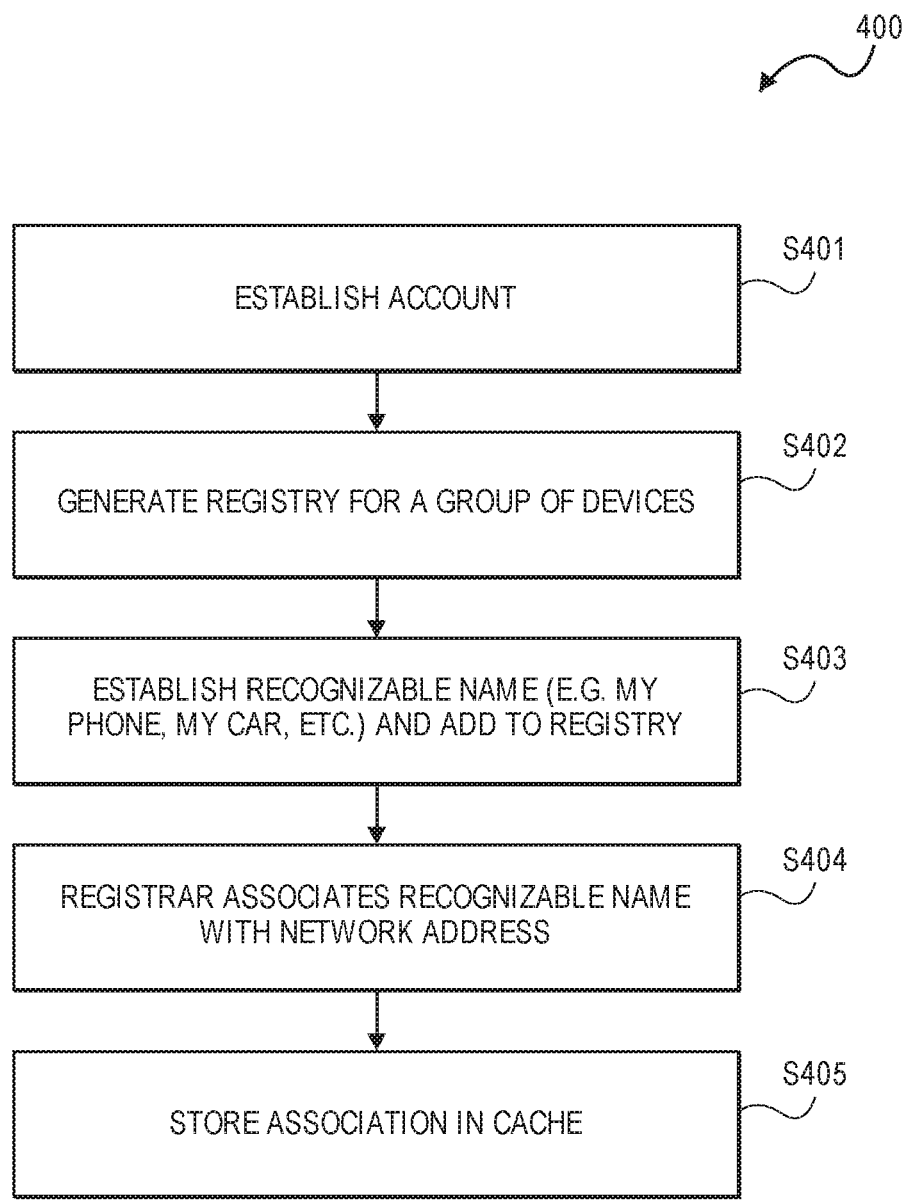
FIG. 4 shows a flowchart depicting registration according to an embodiment.

According to embodiments, IOT devices may exchange private data using a secure method describe herein. FIG. 4 shows a flowchart depicting registration according to an embodiment. Registration may comprise adding one or more IOT devices into a group of devices owned or operated by a user.

At step S401, an account may be established. The account may associated with a user that owns or operates one or more devices in a group of network-enabled devices. Upon establishment of the account, a private key and public key can be attributed to the account, such that can actions and transactions conducted by the account can be signed and approved. The account may further include a username, password, passphrase, and/or other credentials, which may unlock access to the private key for initiating and approving actions and transactions in embodiments.

At step S402, a registry for a group of devices may be generated. The registry may be used to keep track of devices owned or operated by the user, which are registered together as a group. In one embodiment, the registry may be stored in a dedicated server that acts as a registrar. In another embodiment, the registry or portions thereof may be stored in one or more devices of the group.

At step S403, a human-recognizable name for each IOT device in the group of devices may be established and added to the registry. Each human-recognizable name may be a name that the user that owns and/or operates each device can easily recognize, such as a nickname that identifies the owner and device itself (e.g. Frank's car, Zoey's phone, Roy's oven, etc.). The human-recognizable name can then be added to the registry, so as to add the device to the group of devices.

At step S404, a registrar may associate the recognizable name of each device with the device's network address. In one embodiment, the registrar may be a dedicated server, such as a domain name server. Examples of network addresses can included an IP address, telecommunications number, public key, or any other unique identifier that can be used to locate a device according to a given network protocol.

At step S405, the association may further be recorded and stored in a cache of one or more IOT devices. In embodiments, storing the association in cache may allow communications between devices to occur more quickly. Once the devices have been registered into the group of devices, they may share private data between each other according to the method described herein.

Figure 5:
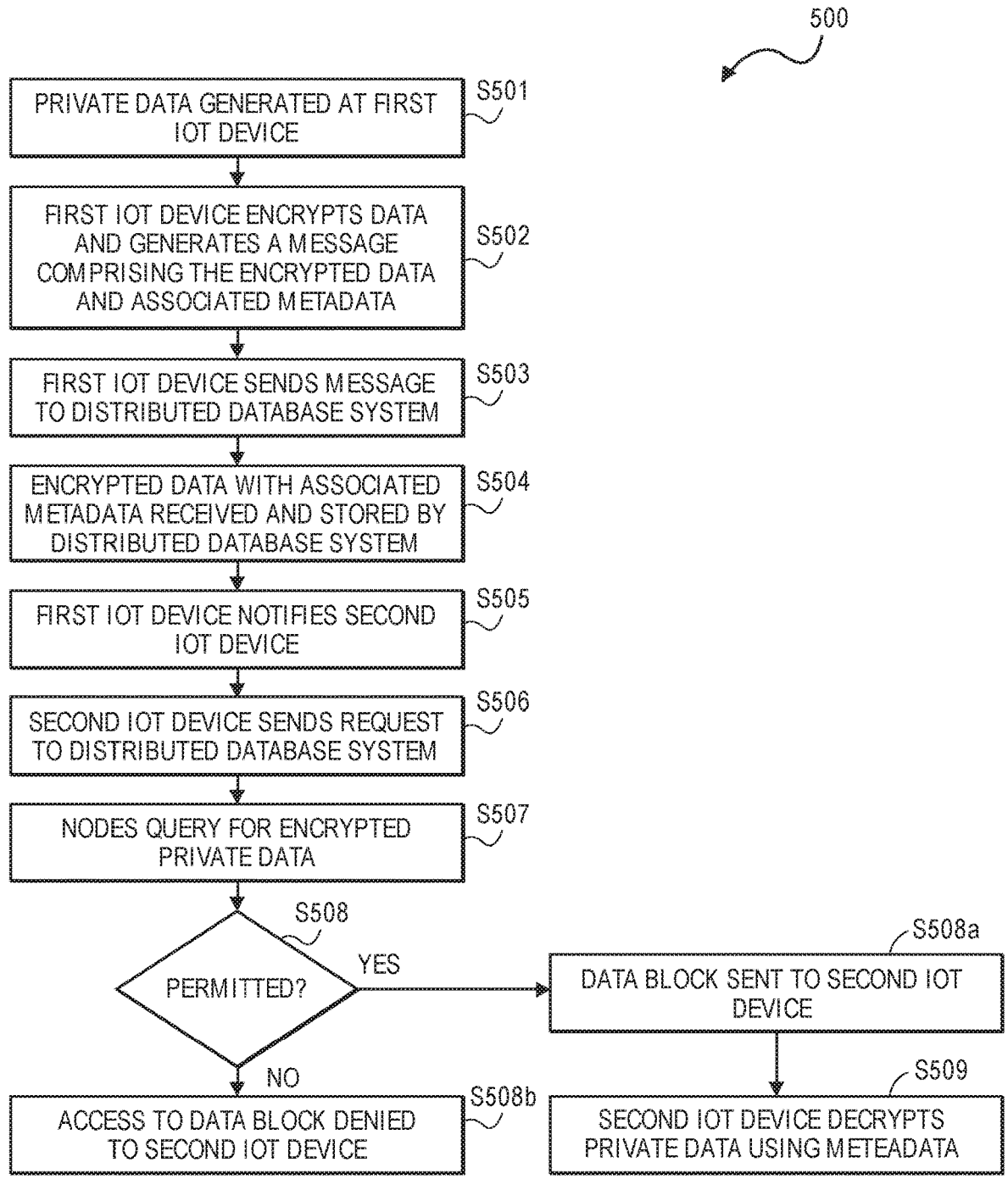
FIG. 5 shows a flowchart for a method of sharing private data between devices according to an embodiment.

FIG. 5 shows a flowchart for a method of sharing private data between devices according to an embodiment. In an embodiment, the method may be implemented by the components of system 100. The components can include a group of IOT devices, such as vehicles, appliances, etc. that can be owned and/or operated by a user.

At step S501, private data may be generated at a first IOT device. For example, the first IOT device can be a mobile device operated by a user and the private data may be the user's location, as given by a GPS locator of the mobile device. In this example, the user may wish to share his or her current location to a self-driving car that can transport the user to a selected location.

At step S502, the first IOT device may encrypt the private data and generate a data message comprising the encrypted private data and a metadata header. In one embodiment the metadata may comprise permissions data, time period validation data, and encryption parameters. In an embodiment, the permissions data may specify one or more devices that are authorized access to the private data and/or specific portions of the private data. For example, the permissions data may identify a second IOT device, which may be a self-driving car of the user that is allowed to access the first IOT device's current location. The time period validation data may include a timestamp and may specify a duration of time for which the private data is to be accessible. The encryption parameters may be information specifying an encryption algorithm and the input variables thereof. According to embodiments, the encryptions parameters may be included in the metadata such that a device in possession of the required symmetric key may use the encryption parameters to decrypt the encrypted private data.

At step S503, the first IOT device may send the data message comprising the encrypted private to a distributed database system. The data message may be sent to the distributed database system over a network, such as the internet. In embodiments, the distributed database system may comprise a plurality of nodes coupled to a plurality of databases.

At step S504, the encrypted private data and associated metadata may be received and stored by the distributed database system. In embodiments, multiple copies of the encrypted private data and/or portions thereof may be stored at multiple nodes of the distributed database system. In embodiments, the nodes may include any device and/or server connected to the network capable of processing and storing data. For example, the nodes may include other IOT devices of other users and data storage thereof.

At step S505, the first IOT device may notify a second IOT device of the private data. The first IOT device may notify the second IOT device by sending a signal. In one embodiment, the signal may be telecommunications signal sent according to a SS7 protocol. The signal may then be received by the second IOT device, and the second IOT device may then be made aware of the private data submitted by the first IOT device.

At step S506, the second IOT device may send an access request to the distributed database system. The access request may comprise an identifier for the first IOT device and an identifier for the second IOT device. In one embodiment, the identifier for the first IOT device may be a public key of the first IOT device and the identifier for the second IOT device may be a public key of the second IOT device.

At step S507, one or more nodes of the distributed database system may query for the encrypted private data. For example, a first node that receives the access request may search its local database for the private data associated with the public key of the first IOT device. If the private data is not in its local database, the node may communicate to a next node that may search its local database and so on until the data has been located. Once the private data has been located, it may be retrieved along with its associated metadata.

At step S508, the one or more nodes may determine if the second IOT device is permitted access to the private data. The determination may comprise comparing an identifier of the second IOT device to permissions data. For example, the public key of the second IOT device received in the access request may be compared to one or more keys specified as authorized in the permissions data.

If in step S508 it is determined that the second IOT device is permitted access, the data block may be sent to the second IOT device at step S508a. At step S509, the second IOT device may decrypt the private data using the metadata associated with the private data. In embodiments, the private data may be decrypted using encryption parameters included in the metadata and using a symmetric key. In one embodiment, the symmetric key may be derived from the public key of the first IOT device, the private key of the second IOT device, and vice versa, such that the key is shared between the two devices and kept secret to others. If in step S508 it is determined that the second IOT device is not permitted access, access to the data block may be denied to the second IOT device at step S508b.

Embodiments described herein provide a number of technical advantages over prior art. Embodiments provide a method for securely sharing private data between a group of network-enabled devices. In embodiments, private data is encrypted and is associated with metadata that provides important information such as who is permitted to access the private data, the duration of time that the private data is accessible, and encryption/decryption information. Furthermore, private data shared according to the systems described are stored in a distributed manner, such that users are not required to trust a centralized service provider to securely and privately store their sensitive information but are still able to maintain their private data as devices are removed and added from a group. Further, in embodiments of the invention, each network-enabled device can securely, but conveniently control who can view or use its private data, and how it can be viewed or used.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by one or more nodes in a distributed database system, an access request from a second network-enabled device to access first private data associated with a first network-enabled device, the access request comprising a first network-enabled device identifier and a second network-enabled device identifier;
   locating, by the one or more nodes, and using the first network-enabled device identifier, a location of the first private data;
   determining, by the one or more nodes, using first permissions data associated with the first private data and using the second network-enabled device identifier, if the second network-enabled device is authorized to access the first private data; and
   providing, by the one or more nodes, encrypted first private data to the second network-enabled device, wherein the second network-enabled device receives and decrypts the encrypted first private data for use by the second network-enabled device,
   wherein the second network-enabled device decrypts the encrypted first private data using a symmetric key that is also known to the first network-enabled device, and
   wherein the first network-enabled device shares the symmetric key with the second network-enabled device using a Diffie-Hellman key exchange protocol.

2. The method of claim 1, wherein the first network-enabled device identifier is a first network-enabled device public key, and wherein the second network-enabled device identifier is a second network-enabled device identifier public key.

3. The method of claim 1, wherein the first network-enabled device is a phone.

4. The method of claim 1, wherein the first network-enabled device is a car.

5. The method of claim 1, further comprising:
   receiving the encrypted first private data from the first network-enabled device, wherein the first network-enabled device encrypts the first private data.

6. The method of claim 1, further comprising:
   maintaining, by one or more nodes of a computer network, a public blockchain, the public blockchain comprising public data associated with the first and second network-enabled devices.

7. The method of claim 1, further comprising:
   performing a registration process involving the first and second network-enabled devices, wherein the first and second network-enabled devices are associated with a group of devices.

8. The method of claim 1, further comprising:
   maintaining, by one or more nodes of a computer network, a blockchain, the blockchain comprising public data associated with the first and second network-enabled devices.

9. The method of claim 1, wherein the encrypted first private data comprises one or more of: a location of the first network-enabled device, instructions for operating the first network-enabled device, a unique identifier for the first network-enabled device, ownership information of the first network-enabled device, and/or operating conditions of the first network-enabled device, in encrypted form.

10. A computer system comprising a processor, and a computer readable medium coupled to the processor, the computer readable medium comprising code for implementing a method to cause the computer system to:
    receive an access request from a second network-enabled device to access first private data associated with a first network-enabled device, the access request comprising a first network-enabled device identifier and a second network-enabled device identifier;
    locate using the first network-enabled device identifier, a location of the first private data;
    determine using first permissions data associated with the first private data and using the second network-enabled device identifier, if the second network-enabled device is authorized to access the first private data; and
    provide encrypted first private data to the second network-enabled device, wherein the second network-enabled device receives and decrypts the encrypted first private data for use by the second network-enabled device,
    wherein the second network-enabled device decrypts the encrypted first private data using a symmetric key that is also known to the first network-enabled device, and
    wherein the first network-enabled device shares the symmetric key with the second network-enabled device using a Diffie-Hellman key exchange protocol.

11. The computer system of claim 10, wherein the first network-enabled device identifier is a first network-enabled device public key, and wherein the second network-enabled device identifier is a second network-enabled device identifier public key.

12. The computer system of claim 10, wherein the first network-enabled device is a television.

13. The computer system of claim 10, wherein the second network-enabled device is a self-driving car.

14. The computer system of claim 10, wherein the computer readable medium further comprises code that further causes the computer system to:
    receive the encrypted first private data from the first network-enabled device, wherein the first network-enabled device encrypts the first private data.

15. The computer system of claim 14, wherein computer readable medium further comprises code that further causes the computer system to:
maintain, in conjunction with one or more nodes of a computer network, a public blockchain, the public blockchain comprising public data associated with the first and second network-enabled devices.

16. The computer system of claim 10, wherein the computer readable medium further comprises code that further causes the computer system to:
perform a registration process involving the first and second network-enabled devices, wherein the first and second network-enabled devices are associated with a group of devices.

17. The computer system of claim 10, wherein the computer readable medium further comprises code that further causes the computer system to:
maintain, in conjunction with one or more nodes of a computer network, a blockchain, the blockchain comprising public data associated with the first and second network-enabled devices.

18. The computer system of claim 10, wherein the encrypted first private data comprises one or more of: a location of the first network-enabled device, instructions for operating the first network-enabled device, a unique identifier for the first network-enabled device, ownership information of the first network-enabled device, and/or operating conditions of the first network-enabled device, in encrypted form.

19. A method for making a request to a distributed database system from a second network-enabled device, the method comprising:
receiving, by the second network-enabled device, a signal, the signal indicating a submission of private data for a first network-enabled device in the distributed database system;
generating, by the second network-enabled device, an access request;
sending, by the second network-enabled device, the access request to one or more nodes in the distributed database system for the submitted private data of the first network-enabled device;
receiving, by the second network-enabled device, the private data in encrypted form, based on a determination by the one or more nodes that the second network-enabled device is authorized access to the private data; and
decrypting, by the second network-enabled device, the encrypted private data using a symmetric key that is also known to the first network-enabled device, wherein the symmetric key is a symmetric key shared between the first network-enabled device and the second network-enabled device using a Diffie-Hellman key exchange protocol.

20. The method of claim 19, wherein the first network-enabled device is a car.

* * * * *